United States Patent

Foote et al.

(10) Patent No.: US 8,915,788 B2
(45) Date of Patent: Dec. 23, 2014

(54) UNIVERSAL JOINT FOR A DOWNHOLE DRILLING MOTOR

(71) Applicant: Cathedral Energy Services Ltd., Nisku (CA)

(72) Inventors: Dean Norman Foote, Edmonton, CA (US); Jason Williams, Nisku (CA)

(73) Assignee: Cathedral Energy Services Ltd., Nisku, Alberta (CA)

( * ) Notice: Subject to any disclaimer, the term of this patent is extended or adjusted under 35 U.S.C. 154(b) by 0 days.

(21) Appl. No.: 13/872,246

(22) Filed: Apr. 29, 2013

(65) Prior Publication Data

US 2013/0288810 A1    Oct. 31, 2013

Related U.S. Application Data

(60) Provisional application No. 61/639,965, filed on Apr. 29, 2012.

(51) Int. Cl.
*F16D 3/221*    (2006.01)
*F16D 3/24*    (2006.01)

(52) U.S. Cl.
CPC    *F16D 3/24* (2013.01); *F16D 3/221* (2013.01); *Y10S 464/906* (2013.01)
USPC .......................... 464/141; 464/152; 464/906

(58) Field of Classification Search
USPC ........... 464/139–141, 152, 155, 906; 175/107
See application file for complete search history.

(56) References Cited

U.S. PATENT DOCUMENTS

| | | | | |
|---|---|---|---|---|
| 2,462,549 A | * | 2/1949 | Pulliam | 464/141 |
| 2,809,504 A | * | 10/1957 | Erish | 464/141 |
| 3,332,256 A | * | 7/1967 | Mazziotti | 464/152 |
| 3,333,440 A | * | 8/1967 | Sharp | 464/152 |
| 3,470,712 A | | 10/1969 | Geisthoff et al. | |

(Continued)

FOREIGN PATENT DOCUMENTS

GB    550579    1/1943

OTHER PUBLICATIONS

"Integral." Dictionary.com. [online], [retrieved on May 20, 2014] Retrieved from the Internet <URL: http://dictionary.reference.com/browse/integral>.*

*Primary Examiner* — Gregory Binda
*Assistant Examiner* — Josh Skroupa
(74) *Attorney, Agent, or Firm* — Davis & Bujold, PLLC; Michael J. Bujold

(57) ABSTRACT

A universal joint carried by an elongate body having an axis. The universal joint has an inner race that pivots omni-directionally within an outer race and a series of first and second opposed cavities formed in the inner race and the outer race. There are a plurality of torque transfer elements, each torque transfer element having a first portion that engages a first cavity and a second portion that engages a corresponding second cavity. The first cavity is a socket that permits rotation of the first portion within the first cavity as the inner race pivots omni-directionally within the outer race and the second cavity is a track oriented in the direction of the axis of the elongate body. The second portion moves along the track as the inner race pivots omni-directionally within the outer race of the second portion along the track. The second portion has at least one drive surface that engages an inner surface of the track at more than one point along the direction of the track.

12 Claims, 7 Drawing Sheets

(56) References Cited

U.S. PATENT DOCUMENTS

| | | | |
|---|---|---|---|
| 4,192,154 A | 3/1980 | Nakamura et al. | |
| RE30,606 E * | 5/1981 | Sharp | 464/140 X |
| 4,318,627 A | 3/1982 | Morin | |
| 4,772,246 A * | 9/1988 | Wenzel | 464/152 X |
| 4,832,657 A | 5/1989 | Hahn | |
| 4,846,763 A | 7/1989 | Di Stefano | |
| 5,184,979 A | 2/1993 | Hazebrook et al. | |
| 6,299,542 B1 * | 10/2001 | Ouchi et al. | 464/906 X |
| 6,685,571 B1 | 2/2004 | Smith | |
| 7,121,950 B2 | 10/2006 | Izumino et al. | |
| 7,632,188 B2 | 12/2009 | Gleasman et al. | |
| 7,887,423 B2 * | 2/2011 | Mondragon et al. | 464/141 |
| 2009/0298597 A1 * | 12/2009 | Wall et al. | 464/140 |

* cited by examiner

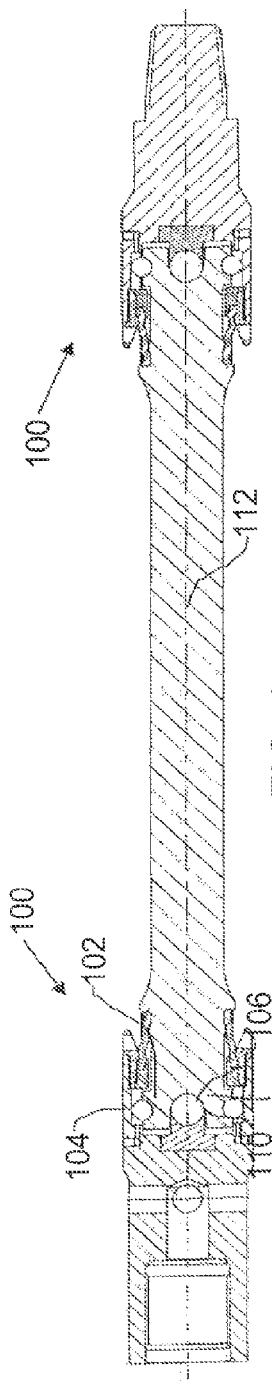
FIG. 1
PRIOR ART
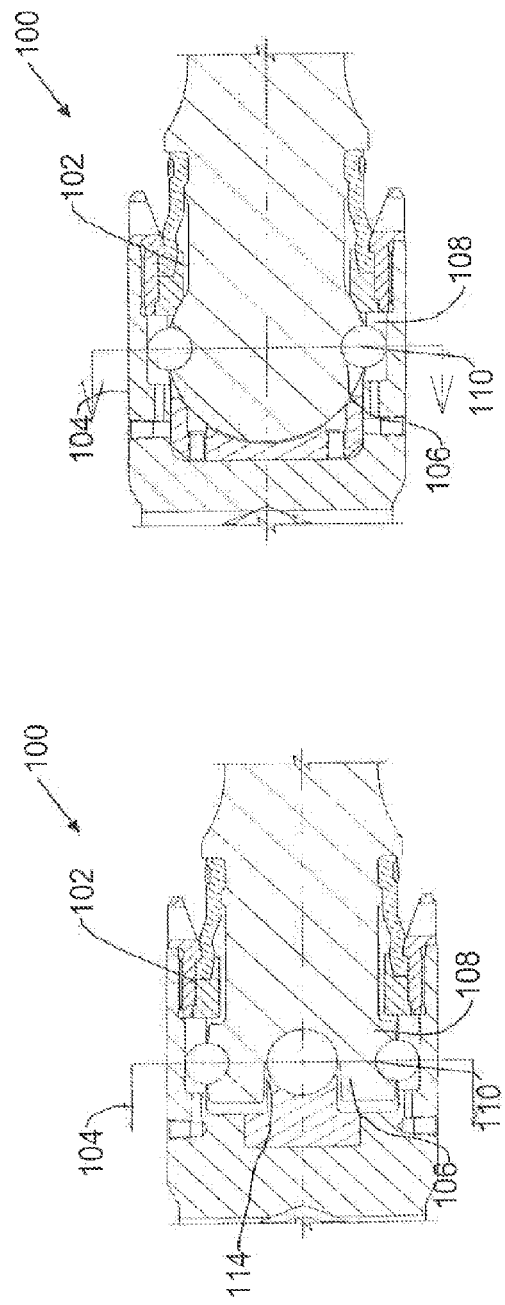
FIG. 2
PRIOR ART
FIG. 3
PRIOR ART

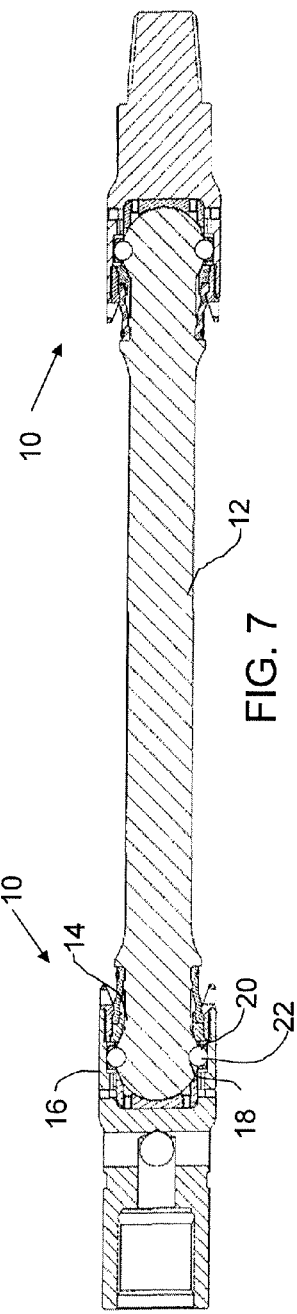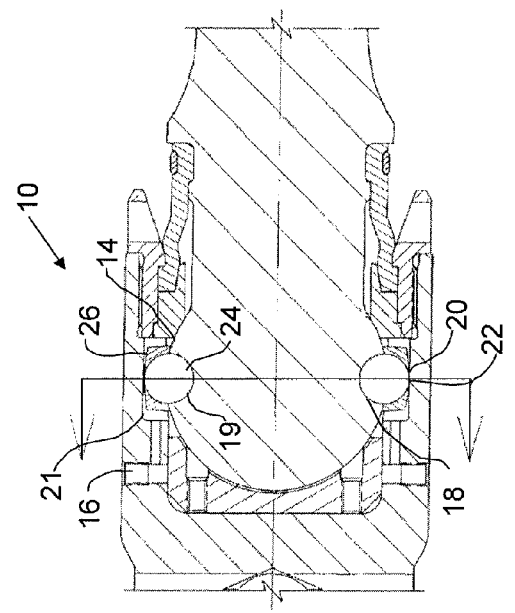

UNIVERSAL JOINT FOR A DOWNHOLE DRILLING MOTOR

FIELD

This relates to a method and apparatus for providing substantially increased drive capacity between the internal mating surfaces of a universal drive assembly for a down hole drilling motor.

BACKGROUND

The Universal Joint Assembly for a down hole drilling motor must accommodate substantial rotary input torque and thrust from the oscillating and rotating member of the power section and translate this motion and torque to an axially uniform rotation for the bearing assembly. A typical universal joint assembly may have zero, one or two movable ends to accommodate this motion from the power section. In the case of movable ends, common methods include thrust ball(s) or spherical end(s) on the ends of the universal joint shaft for the axial thrust and drive balls arranged about the outside circumference on one or both ends of the universal joint shaft for rotational loads. The drive balls are allowed to move axially in the cylindrical recesses of their mating parts. This allows the shaft to pivot angularly while delivering rotational torque through the universal joint system.

However, a capacity limitation arises in the drive ball and cylinder method utilized in this method. The drive ball has a spherical shape and when mated with a cylinder, the contact between the two components is a "line" of contact between mating surfaces. In theory, neglecting material deformation, the surface area of contact between these mating surfaces is zero. When high torque loads are applied to these surfaces, the contact stresses quickly exceed their material limits and the surfaces begin to wear. As wear progresses, the movable end(s) of the universal joint begin to "bind" which results in the development of bending stresses in the system. These bending stresses often lead to failures.

A universal joint known in the prior art is shown in FIG. 1-6 and is generally indicated by reference numeral 100. Referring to FIG. 1, universal joint 100 has an inner race 102 and an outer race 104. Inner race 102 is locked within outer race 104, but is permitted to pivot omnidirectionally. Inner race 102 has a series of semi-spherical cavities 106 while outer race 104 has a series of corresponding channels 108. As shown in FIG. 4, channels 108 have a semi-circular cross-section. Channels 108 are oriented along the direction of the axis of the shaft 112 on which universal joint 100 is carried. Referring to FIGS. 5 and 6, torque transfer elements 110 are spherical in shape such that a portion engages cavities 106 and another portion engages channel 108. Torque transfer elements are able to move along channels 108 while permitting relative pivotal movement of inner race 102 and outer race 106. The shape of inner and outer races 102 and 104 may vary. As shown in FIG. 2, inner race 102 may be square and pivot around a central pivot point 114, or, as shown in FIG. 3, may be rounded and pivot as a ball joint. The universal joint design described below may be used with these or other designs.

SUMMARY

There is provided a universal joint assembly with an increased contact area between the mating internal torque parts, which increases the capacity of the entire universal joint torque system. The first step is to provide an area of contact for the drive balls to "act" against without inhibiting its ability to pivot. The second step is to provide an area of contact for the mating part without inhibiting it ability to pivot. Both steps are achieved by placing a "drive key" with an internal shape to fit the drive ball and an external shape to fit a modified shape in the mating part.

According to an aspect, there is provided a universal joint carried by an elongate body having an axis. The universal joint comprises an inner race that pivots omni-directionally within an outer race. A series of first and second opposed cavities are formed in the inner race and the outer race. A plurality of torque transfer elements have a first portion that engages a first cavity and a second portion that engages a corresponding second cavity. The first cavity comprises a socket that permits rotation of the first portion within the first cavity as the inner race pivots omni-directionally within the outer race. The second cavity comprises a track oriented in the direction of the axis of the elongate body, the second portion moving along the track as the inner race pivots omni-directionally within the outer race of the second portion along the track. The second portion comprises at least one drive surface that engages an inner surface of the track at more than one point along the direction of the track.

According to another aspect, the first cavity may be a semi-spherical cavity and the first portion may be a semi-spherical body corresponding to the size and shape of the semi-spherical cavity.

According to another aspect, the first portion of the torque transfer element may be offset away from a central axis of the second portion, wherein the central axis is in the direction of the axis of the elongate body.

According to another aspect, the first portion of the torque transfer element may be integrally formed with the second portion.

According to another aspect, the second cavity may comprise a track having a rectangular cross-section and second portion of the torque transfer element comprises a body having a rectangular cross-section that engages the track.

According to another aspect, the second portion of the body may have tapered leading and trailing surfaces.

According to another aspect, the cross-sectional shape of the at least one drive surface may be complementary to the cross-sectional shape of the track at each of the more than one point along the track.

According to another aspect, the track may be a semi-cylindrical channel and the at least one drive surface is semi-cylindrical.

According to another aspect, the drive surface may have a consistent cross-sectional shape for a length in the direction of the track.

According to another aspect, the drive surface of the second portion may have a length that is greater than a diameter of the first portion.

Other aspects will be apparent from the specification and drawings.

According to another aspect, the first cavity may be in the inner race and the second cavity may be in the outer race.

BRIEF DESCRIPTION OF THE DRAWINGS

These and other features will become more apparent from the following description and appended drawings. The drawings are for illustration only and are not intended in any way to limit the scope of the invention to the particular embodiment or embodiments shown, wherein:

FIG. 1 is a side elevation view in section of a PRIOR ART universal joint.

FIG. 2 is a detailed side elevation view in section of the PRIOR ART universal joint in FIG. 1.

FIG. 3 is a detailed side elevation view in section of an alternative PRIOR ART universal joint.

FIG. 7 is a side elevation view in section of a universal joint.

FIG. 8 is a detailed side elevation view of the universal joint of FIG. 7

DETAILED DESCRIPTION

Figure 4:
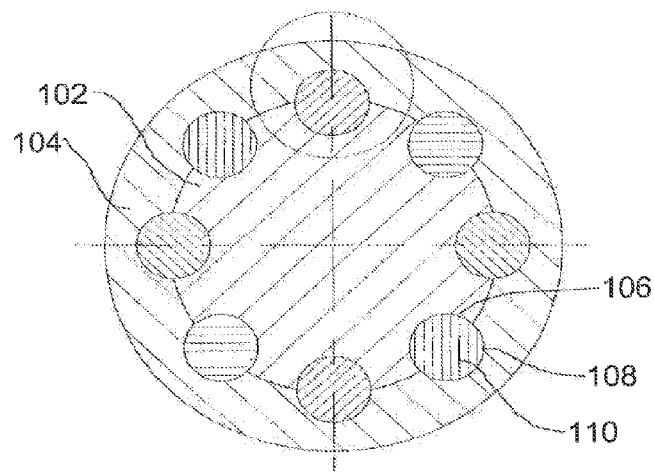
FIG. 4 is an end elevation view of the PRIOR ART universal joint of FIG. 1.
Figure 5:
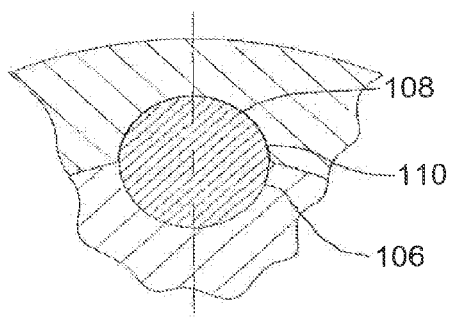
FIG. 5 is a detailed end elevation view in section of a connection in the PRIOR ART universal joint of FIG. 1
Figure 6:
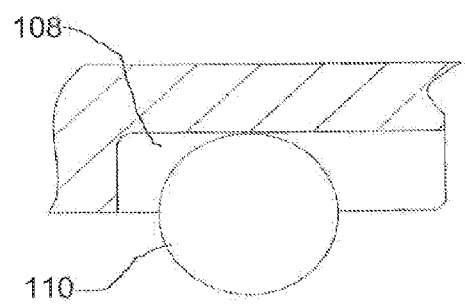
FIG. 6 is a detailed side elevation view in section of the connection of FIG. 5

A universal joint, generally identified by reference numeral 10, will now be described with reference to FIG. 7 through 21.

Figure 9:
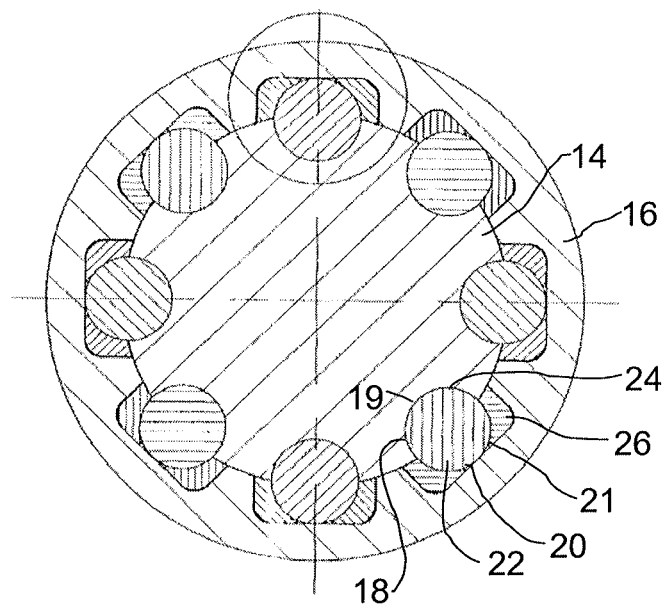
FIG. 9 is an end elevation view in section of the universal joint in FIG. 7

Referring to FIG. 7, universal joint 10 is carried by an elongate body 12, such as a shaft as shown, having an axis that extends along the length of shaft 12. As shown there may be a universal joint 10 positioned at either end of shaft body 12. Referring to FIGS. 8 and 9, universal joint 10 has an inner race 14 that pivots omni-directionally within an outer race 16. There are a series of first cavities 18 formed in inner race 14 and corresponding second cavities 20 opposed to first cavities 18 formed in outer race 16. Torque transfer elements 22 are positioned to engage both first cavities 18 and second cavities 20. As shown, universal joint has a ball and socket design, but may also have the design shown in FIG. 2 with a pivot point.

Figure 10:
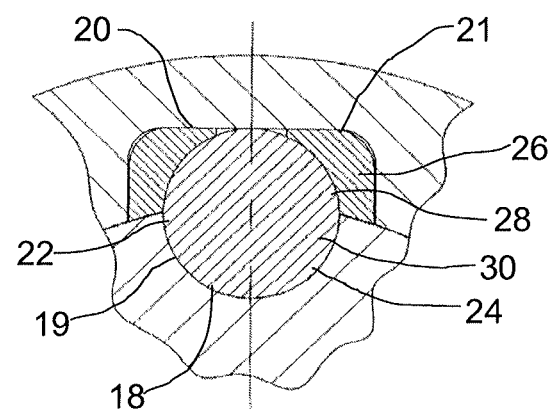
FIG. 10 is a detailed end elevation view of a connection of the universal joint in FIG. 7.
Figure 11:
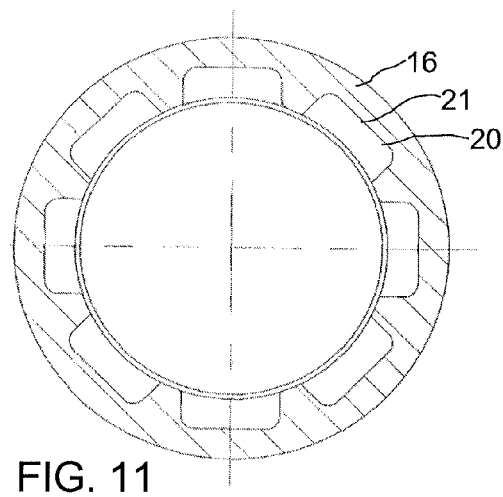
FIG. 11 is an end elevation view in section of the outer race of the universal joint in FIG. 7.

Referring to FIG. 10, each torque transfer element 22 has a first portion 24 that engages first cavity 18 and a second portion 26 that engages second cavity 20. In the example shown in FIG. 12, second portion 26 is larger than first portion 24, and has a generally rectangular cross-sectional area, which is designed to engage second cavity 20 that has a similar cross-sectional area, as shown in FIG. 11. Preferably, second portion 26 has a cross-sectional shape that is complementary to the cross-sectional shape of second cavity 20. Preferably, the drive surface of second portion 26 has a consistent cross-sectional shape in the direction of track 21.

Referring to FIG. 10, first cavity 18 is made up of a socket 19 that permits rotation of first portion 24 within first cavity 18 as inner race 14 pivots omni-directionally within outer race 16. Preferably, socket 19 is semi-spherical in shape and receives a semi-spherical first portion 24 that corresponds to the size and shape of the semi-spherical cavity. Second cavity 20 is made up of a track 21 oriented in the direction of the axis of shaft body 12. Referring to FIG. 11, second portion 26 moves along track 21 as inner race pivots omni-directionally within outer race 16. As shown, second portion 26 has a drive surface, i.e. the surface that faces the direction of rotation of shaft 12 engages second portion 26 that engages an inner surface of the track at more than one point along the direction of the track. This may be done in various ways, examples of which will be discussed below.

Figures 12, 13:
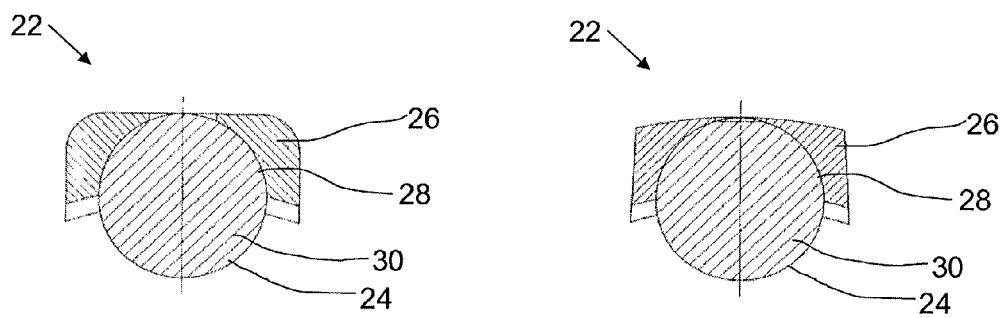
FIG. 12 is an end elevation view in section of a torque transfer element.
FIG. 13 is a side elevation view in section of a torque transfer element.
Figure 14:
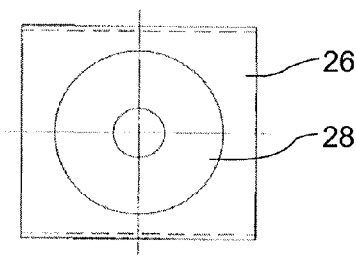
FIG. 14 is a bottom plan view of the torque transfer element.
Figure 15:
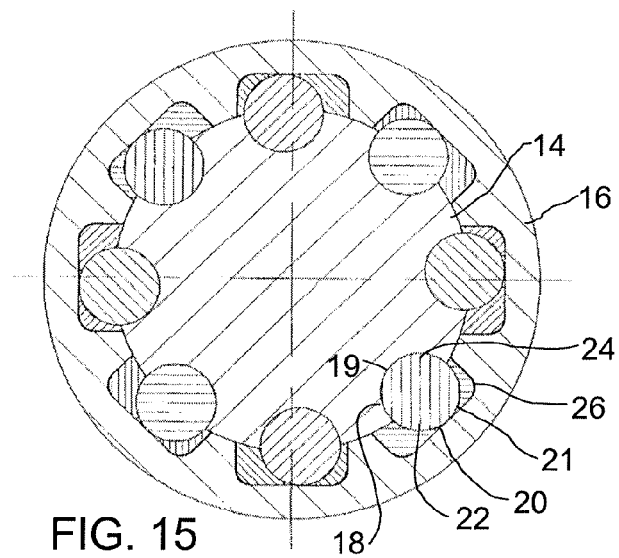
FIG. 15 is an end elevation view in section of an alternative universal joint.
Figure 16:
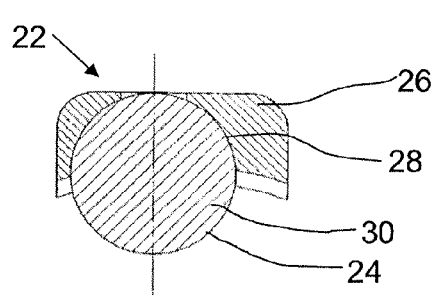
FIG. 16 is an end elevation view in section of a torque transfer element of the universal joint in FIG. 15.
Figure 17:
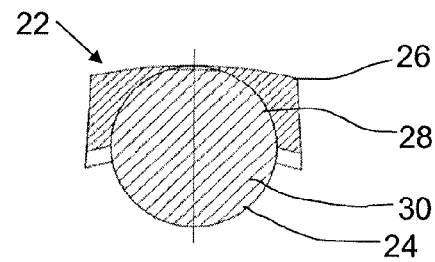
FIG. 17 is a side elevation view in section of a torque transfer element of the universal joint in FIG. 15.
Figure 18:
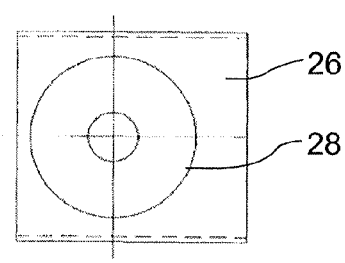
FIG. 18 is a bottom plan view of the torque transfer element of the universal joint in FIG. 15.
Figure 19:
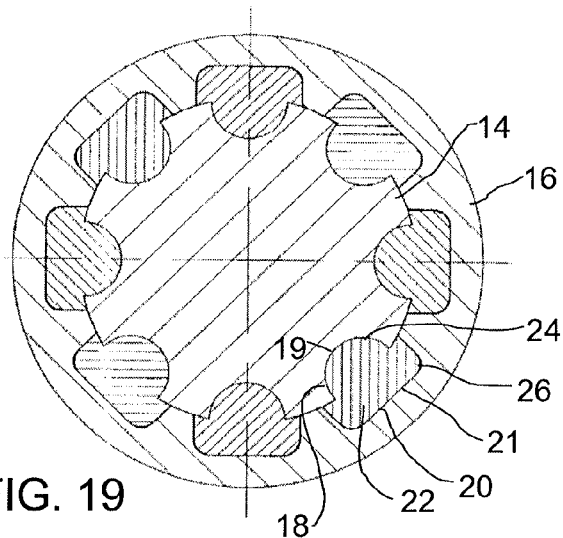
FIG. 19 is an end elevation view in section of a further alternative universal joint.
Figure 20:
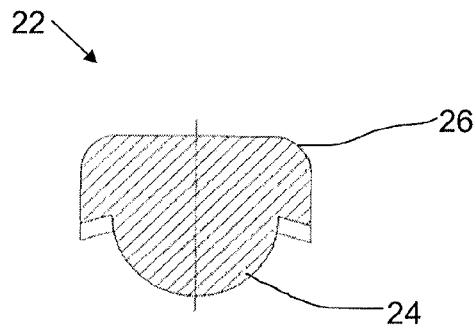
FIG. 20 is an end elevation view in section of a torque transfer element of the universal joint in FIG. 19.
Figure 21:
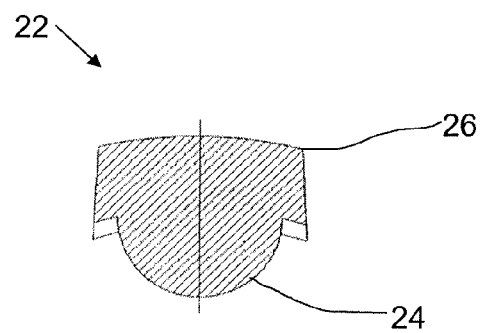
FIG. 21 is a side elevation view in section of a torque transfer element of the universal joint in FIG. 19.

Referring to FIG. 13, second portion may have tapered sides on the leading and trailing surfaces, i.e. those surfaces that face the direction of movement within second cavity 20. In the depicted example, second portion 26 is an upper cap and has a round or semi-spherical cavity 28 that receives the upper portion of a sphere 30. If only sphere 30 were used as torque transfer element 22, there would only be a single line of contact between sphere 30 and second cavity 20, even if the cross-section of second cavity 20 conformed to sphere 30. Using the depicted example, the entire drive surface (i.e. the side facing the direction of rotation) of sphere 30 is fully engaged such that the surface area capable of transferring torque is significantly increased. Torque is then transferred to outer race 16 by a flat surface that engages second cavity 20, which as can be seen, has a greater surface area compared with a sphere 30, as well as a better angle of engagement. As can be seen, the load transfer between inner race 14 and outer race 16 occurs at the largest diameter of sphere 30, which allows for maximum area for load transfer to occur. Alternatively, referring to FIG. 19-21, torque transfer element 22 may have first and second portions 24 and 26 integrally formed. However, it is generally preferred that the drive surface of second portion 26 (i.e. the portion that engages track 21) is longer than the diameter of first portion 24. Referring to FIG. 15-18, first portion 24 of torque transfer element 22 may be offset away from the center of second portion 26, such that it is positioned either closer or farther from the drive surface of second portion 26. It will be understood that, at minimum, the drive surface, or the surface facing the direction of rotation, will contact the inner surface of track 21, at two or more spaced apart positions in the direction the track extends. This may be contrasted with a single drive ball that has a drive surface that contacts the track at a single point in the direction of rotation, although it may contact the other side of the track opposite the drive surface.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples above.

What is claimed is:

1. A universal joint carried by an elongate body having an axis, the universal joint comprising:

an inner race that pivots omni-directionally within an outer race;

a series of first and second opposed cavities formed in the inner race and the outer race;

a plurality of torque transfer elements, each torque transfer element having a first portion that engages a corresponding first cavity and a second portion that is fixed in position relative to the first portion and engages a corresponding second cavity, wherein the first cavity comprises a socket that permits rotation of the first portion within the first cavity as the inner race pivots omni-directionally within the outer race; and the second cavity comprises a track oriented in the direction of the axis of the elongate body, the second portion moving along the track as the inner race pivots omni-directionally within the outer race, the second portion comprising at least one drive surface that simultaneously engages an inner surface of the track at more than one point along the direction of the track.

2. The universal joint of claim 1, wherein the first cavity is a semi-spherical cavity and the first portion is a semi-spherical body corresponding to the size and shape of the semi-spherical cavity.

3. The universal joint of claim 1, wherein the first portion of the torque transfer element is offset away from a central axis of the second portion, wherein the central axis of the second portion is parallel to the axis of rotation of the elongate body.

4. The universal joint of claim 1, wherein the first portion of the torque transfer element is integrally formed with the second portion.

5. The universal joint of claim 1, wherein the second cavity comprises a track having a rectangular cross-section and the second portion of the torque transfer element comprises a body having a rectangular cross-section that engages the track.

6. The universal joint of claim 1, wherein the second portion of the body has tapered leading and trailing surfaces, wherein the leading and trailing surfaces face the direction of movement within second cavity.

7. The universal joint of claim 1, wherein the cross-sectional shape of the at least one drive surface is complementary to the cross-sectional shape of the track at each of the more than one point along the track.

8. The universal joint of claim 1, wherein the drive surface has a consistent cross-sectional shape for a length in the direction of the track.

9. The universal joint of claim 1, wherein the drive surface of the second portion has a length that is greater than a diameter of the first portion.

10. The universal joint of claim 1, wherein the first cavity is in the inner race and the second cavity is in the outer race.

11. The universal joint of claim 1, wherein the torque transfer element comprises a spherical element that is received by an upper cap.

12. The universal joint of claim 1, wherein the first portion rotates relative to the second portion.

\* \* \* \* \*